Patented Dec. 9, 1941

2,265,312

UNITED STATES PATENT OFFICE 2,265,312

PROCESS FOR MAKING ALKENYL BENZENES AND CHLOROBENZENES

William M. Quattlebaum and Donald M. Young, Charleston, W. Va., assignors to Carbide and Carbon Chemicals Corporation, a corporation of New York No Drawing. Application November 14, 1940, Serial No. 365,567

13 Claims. (Cl. 260—669)

This invention relates to a process for making alkenyl benzenes, or styrenes, from halogenated-alkyl benzenes. Specifically, the invention provides an improved process for removing hydrogen halide from halogenated-akyl benzenes, or halogenated-alkyl halogen substituted benzenes, in vapor phase under such conditions that alkenyl benzenes, or alkenyl halogen substituted benzenes, are produced at high reaction rates and in good yields.

The halogenated-alkyl benzenes suitable for the production of styrenes or halogen substituted styrenes by this process are those in which a halogen is substituted in the alpha position in a side chain, or alkyl group attached to benzene or benzene having one or more halogens attached to the ring. These compounds may be prepared by any of the usual methods, although the chloroalkyl and bromoalkyl benzenes are most easily made by the direct halogenation of the alkyl benzene, using the corresponding phosphorus tri- or pentahalide as a catalyst, or using ultraviolet light, to confine the substitution to a side chain. In the case of the halogen substituted styrenes, the halogen substitution in the ring may be effected before halogenation of the alkyl side chain, and this can be done in any of the well known ways, such, for instance, as by the use of ferric chloride as a catalyst. Throughout this specification and the appended claims the expressions "styrene," "alkyl benzenes," "alkenyl benzenes" and the like, will be understood to include those compounds which may or may not have one or more halogens attached to the benzene ring.

The removal of hydrogen halide from halogenated-alkyl benzene is ordinarily accomplished by heating the latter with theoretical or excess quantities of certain bases, such as quinoline, pyridine, other amines, and the like. All the known processes for the removal of hydrogen halide from the halogenated-alkyl benzene to form styrenes are attended with certain serious disadvantages. The use of excess or even theoretical amounts of the required bases is almost prohibitive from the commercial standpoint.

In liquid phase processes for the preparation of styrene, the use of amines and amine salts in less than theoretical amounts has heretofore been suggested. However, these liquid phase processes of the prior art are not suitable for commercial scale operation. One difficulty in this respect apparently is the fact that such liquid phase reactions are very sensitive to metallic impurities and that these are almost invariably present in actual commercial operation. These impurities cause the formation of resinous material, which lowers the yield of styrene. We have discovered that such resinification is practically avoided, or occurs to only a negligible extent, when the reaction is carried out in the vapor phase even though this is done in metal equipment and traces of metal salts are present. Thus higher yields are obtained in plant operation of the process of the present invention than are feasible commercially in the operation of the processes of the prior art.

Since this invention is especially applicable to the production of vinyl benzene, or styrene (and vinyl chlorobenzenes, chlorostyrenes), by the removal of hydrogen chloride from chloroethyl benzene (and chloroethyl chlorobenzenes), the following description of the process refers specifically thereto, although the process may be applied to the production of other alkenyl benzenes with satisfactory results.

Pure chloroethyl benzene may be dehydrochlorinated by heating in the presence of an amine or amine salt at a temperature preferably from about 150° to about 350° C. The exact temperature of operation will depend upon the particular circumstances of operation. The dehydrochlorination of the chloroethyl benzene may be conducted entirely in the vapor phase, or it may be carried out in the liquid phase by heating chloroethyl benzene containing substantial quantities of dissolved amine salt, or by heating an amine salt in which is maintained at least 1%, and preferably 5% to 10%, of dissolved chloroethyl benzene.

This application is directed specifically to the process in which the reaction is conducted in vapor phase. The process in which the reaction is conducted in liquid phase is the subject of our copending application Serial No. 162,144, filed September 2, 1937, now Patent No. 2,231,026. In carrying out the vapor phase process, the chloroethyl benzene (or chloroethyl chlorobenzene) containing about 1.0% of an amine, such as dioctyl amine, diamyl amine or quinoline, or an amine salt, such as the hydrochloride of one of the amines mentioned, is passed through a chamber or series of tubes maintained at a temperature of about 300° to about 350° C. The issuing product is then condensed, and, preferably, distilled to recover the pure styrene and to separate the unchanged chloroethyl benzene.

Various amines are suitable for use in this process. The following amines and their salts have been used most successfully in this reaction: di-2-ethylhexyl amine, diamylamine, triamylamine, dioctylethylamine, dioctylbenzylamine and di-2-ethylbutylamine. The preferred catalyst is di-2-ethylhexylamine hydrochloride. The catalysts may be recovered after use by distillation under reduced pressure, or by neutralizing the spent catalyst with alkali and distilling the free amine.

The process of this invention will be illustrated by the following examples:

Example 1

Chloroethyl benzene (2000 g.) containing 20 g. of dioctylamine (1%), was passed at the rate of 400 cc. per hour through a 2" x 40" electrically heated commercial nickel-molybdenum alloy tube (containing about 30% molybdenum) which was vertically suspended, and filled with 1850 cc. of artificial silica filter stone. The temperature of the vaporizing section (first 12 inches of tube) was maintained at about 240° to 250° C., and that of the second zone (lower 24 inch section of tube) was maintained at 300° to 375° C. The product was condensed in a down-draft condenser, and the hydrogen chloride was passed through a tube packed with glass rings to remove entrained material and finally absorbed in water. After running for 4 hours, a total of 1561 g. of condensate was obtained, which upon distillation under reduced pressure yielded 1002 g. of pure styrene (B. P. 55° to 56° C. at 30 mm.) and 548 g. of chloroethyl benzene (82° to 83° C. at 20 mm.) representing an overall yield of 68% and an efficiency of 93%.

Example 2

A similar run was carried out on a larger scale using a tube with an inside diameter of 3 inches, a length of 10 feet, and constructed of the same nickel-molybdenum alloy used in Example 1. The tube was packed with artificial silica filter stone and electrically heated. The temperature of the reaction zone was maintained at about 320° C. The chloroethyl benzene, containing 1% by weight of dioctylamine, was passed through the tube at the average rate of 3.4 gallons per hour. A total of 635 pounds of chloroethyl benzene was passed through the tube over a period of 21.5 hours. On distilling the crude product, 249 pounds of pure styrene was obtained, together with 281 pounds of chloroethyl benzene. This represented a yield of 53% and an efficiency of 95%.

Example 3

The chloroethyl chlorobenzene used in this experiment was prepared by chlorinating ethyl benzene in the ring in the presence of 0.1% of anhydrous ferric chloride to give ethyl chlorobenzene, which, after distillation, was in turn chlorinated in the side chain under ultraviolet light. A mixture of 990 g. of chloroethyl chlorobenzene and 10 g. of dioctylamine was passed at a rate of 400 cc. per hour through a one-inch glass tube containing 250 cc. of artificial silica filter stone and maintained at a temperature of 340° to 350° C. The product was condensed, and after distillation it yielded 377 g. of monochlorostyrene (B. P. 50° to 51° C. at 4 mm.) and 456 g. of recovered chloroethyl chlorobenzene (B. P. 70° to 75° C. at 4 mm.). This represents a monochlorostyrene yield of 48.2% and an efficiency of 89.3%.

Example 4

A mixture of 100 parts of chloroethyl chlorobenzene and one part of quinoline was treated as outlined in Example 3. A 55.3% yield of monochlorostyrene, with a 90.2% efficiency, was obtained.

Although the invention has been described in detail in connection with the production of styrene from chloroethyl benzene and of chlorostyrene from chloroethyl chlorobenzene, it may also be employed for the production of other alkenyl benzenes and of other alkenyl halogenated benzenes. For example, diethyl benzene may be chlorinated and treated to produce divinyl benzene, and bromine may replace the chlorine in the process.

Other amines or salts of amines may be used as catalysts, but, in general, the higher aliphatic amines or amine salts are preferred. The quantities of amines or salts used as catalysts may be varied considerably, but for this process of vapor phase dehydrohalogenation of the halogenated-alkyl benzene, amounts of about 0.1% to 1.0% of the amines or salts are preferred.

Materials which may be used for reaction equipment for the process of this invention are those which are resistant to corrosion by hydrogen halides, for example, silica, glass, tantalum and molybdenum. More specifially, however, for large scale operation, a commercial nickel-molybdenum alloy containing about 30% of molybdenum has been found most satisfactory as the material for the reaction tube.

The foregoing description is given by way of illustration, and many modifications of the process may be made within the scope of the invention as defined by the appended claims.

We claim:

1. Process for making alkenyl benzenes which comprises forming a mixture containing one of the group consisting of alpha halogenated-alkyl benzenes and alpha halogenated-alkyl halogenated benzenes with one of the group consisting of amines and amine salts and passing said mixture through a reaction zone heated to a temperature above the boiling point of said mixture under the conditions of operation.

2. Process for making alkenyl benzenes which comprises passing an alpha halogenated-alkyl benzene admixed with an amine through a reaction zone heated to a temperature above the boiling point of the mixture of the alpha halogenated-alkyl benzene and amine under the conditions of operation.

3. Process for making an alkenyl benzene which comprises subjecting an alpha halogenated-alkyl benzene, admixed with small amounts of a catalyst consisting of an amine salt, in the vapor phase, to a temperature sufficiently high to cause separation of hydrogen halide therefrom, and recovering the alkenyl benzene thus formed.

4. Process for making alkenyl halogenated benzenes which comprises passing an alpha halogenated-alkyl halogenated benzene admixed with an amine through a reaction zone heated to a temperature above the boiling point of the mixture of the alpha halogenated-alkyl halogenated benzene and amine under the conditions of operation.

5. Process for making an alkenyl halogenated benzene which comprises subjecting an alpha halogenated-alkyl halogenated benzene, admixed with small amounts of a catalyst consisting of an amine salt, in the vapor phase, to a temperature sufficiently high to cause separation of hydrogen halide therefrom, and recovering the alkenyl halogenated benzene thus formed.

6. Process for making styrenes which comprises passing an alpha halogenated-ethyl benzene admixed with an amine through a reaction zone heated to a temperature above the boiling point of the mixture of the alpha halogenated-ethyl benzene and amine under the conditions of operation.

7. Process for making alkenyl benzenes which comprises subjecting an alpha halogenated-ethyl benzene, admixed with small amounts of a catalyst consisting of a salt of an amine having at least two substituent organic radicals each of which has more than four carbon atoms, in the vapor phase, to a temperature between about 200° and about 350° C., and recovering the alkenyl benzene thuse formed.

8. Process for making halogenated styrenes which comprises passing an alpha halogenated-ethyl halogenated benzene admixed with an amine through a reaction zone heated to a temperature above the boiling point of the mixture of the alpha halogenated-ethyl halogenated benzene and amine under the conditions of operation.

9. Process for making alkenyl halogenated benzenes which comprises subjecting an alpha halogenated-ethyl halogenated benzene, admixed with small amounts of a catalyst consisting of a salt of an amine having at least two substituent organic radicals each of which has more than four carbon atoms, in the vapor phase, to a temperature between about 200° and about 350° C., and recovering the alkenyl halogenated benzene thus formed.

10. Process for making styrene which comprises passing chloroethyl benzene admixed with an amine through a reaction zone heated to a temperature above the boiling point of the mixture of the chloroethyl benzene and amine under the conditions of operation.

11. Process of making styrene which comprises subjecting alpha chloroethyl benzene, admixed with small amounts of a catalyst consisting of a salt of an amine having at least two substituent organic radicals each of which has more than four carbon atoms, in the vapor phase, to a temperature between about 200° and about 350° C., and recovering the styrene thus formed.

12. Process for making chlorostyrenes which comprises passing a chloroethyl chlorobenzene admixed with an amine through a reaction zone heated to a temperature above the boiling point of the mixture of the chloroethyl chlorobenzene and amine under the conditions of operation.

13. Process of making chlorostyrenes which comprises subjecting an alpha chloroethyl chlorobenzene, admixed with small amounts of a catalyst consisting of a salt of an amine having at least two substituent organic radicals each of which has more than four carbon atoms, in the vapor phase, to a temperature between about 200° and about 350° C., and recovering the chlorostyrene thus formed.

WILLIAM M. QUATTLEBAUM.
DONALD M. YOUNG.